United States Patent [19]

Fabian et al.

[11] 4,239,549

[45] Dec. 16, 1980

[54] EASILY WATER-DISPERSED FORMULATIONS OF FINELY DIVIDED PHTHALOCYANINES

[75] Inventors: Wolfgang Fabian, Wilhelmsfeld; Joachim Kranz, Ludwigshafen; Guenter Stoeckelmann, Frankenthal, all of Fed. Rep. of Germany

[73] Assignee: BASF Aktiengesellschaft, Fed. Rep. of Germany

[21] Appl. No.: 815,986

[22] Filed: Jul. 15, 1977

[30] Foreign Application Priority Data

Aug. 5, 1976 [DE] Fed. Rep. of Germany ....... 2632214

[51] Int. Cl.$^3$ .................... C09B 47/04; D06P 3/14; D06P 3/60
[52] U.S. Cl. .................... 106/308 Q; 106/228; 106/308 S; 260/314.5
[58] Field of Search ................ 260/314.5; 106/308 Q, 106/308 S, 288 Q; 8/89 R

[56] References Cited

U.S. PATENT DOCUMENTS

| 1,901,506 | 3/1933 | Gunther | 8/89 |
|---|---|---|---|
| 2,006,557 | 7/1935 | Lenher et al. | 8/89 X |
| 2,058,489 | 10/1936 | Murch et al. | 8/6 |
| 2,375,120 | 5/1945 | Loukomsky et al. | 260/314.5 |
| 2,524,672 | 10/1950 | Lecher et al. | 260/314.5 |
| 2,930,796 | 3/1960 | Katz et al. | 260/314.5 |
| 3,022,299 | 2/1962 | Schmidt et al. | 260/314.5 X |
| 3,080,375 | 3/1963 | Katz | 260/314.5 |
| 3,775,149 | 11/1973 | Langley et al. | 260/314.5 X |
| 4,069,064 | 1/1978 | Nett et al. | 260/314.5 X |

FOREIGN PATENT DOCUMENTS 246507   6/1927   United Kingdom ................ 260/314.5

*Primary Examiner*—Floyd D. Higel
*Attorney, Agent, or Firm*—Keil & Witherspoon

[57] ABSTRACT

Easily water-dispersed formulations of a phthalocyanine pigment which contain—based on the formulation—(a) from 70 to 95% by weight of finely divided phthalocyanine pigment of which the mean primary particle size is less than 0.5 $\mu$m, and (b) from 30 to 5% by weight of one or more alkylarylsulfonic acids, where alkyl is of 4 to 20 carbon atoms, but the sum of the alkyl carbon atoms is not less than 8, which alkylarylsulfonic acids may be in the form of water-soluble salts. A fine dispersion of the formulations is obtainable by sprinkling the formulations into water and shaking. The dispersions obtained are stable and can be filtered through a paper filter without leaving a residue. The finely dispersed pigment is absorbed quantitatively on wool, cotton or paper pulp.

16 Claims, No Drawings

EASILY WATER-DISPERSED FORMULATIONS OF FINELY DIVIDED PHTHALOCYANINES

The present invention relates to new easily water-dispersed formulations of phthalocyanines, and to their manufacture and use.

Water-dispersible formulations of phthalocyanine pigments have been disclosed. These are mixtures of phthalocyanine pigments with one or more water-soluble surfactants which are conventionally used as dispersants. Examples of such surfactants are condensation products of phenols, e.g. phenol or cresol, formaldehyde and/or phenolsulfonic acids and sodium sulfite or condensation products of $\beta$-naphthalenesulfonic acid with formaldehyde, and mixtures of such compounds. In order that the phthalocyanine pigment contained in such formulations shall be readily dispersible in water or aqueous media, these formulations must contain substantial amounts of the surfactants, i.e. as a rule from 30 to 40 percent by weight of phthalocyanine pigment and from 60 to 70 percent by weight of surfactants. In general, these formulations are prepared by kneading or milling the pigment, produced in a finely divided form by reprecipitation, with the surfactants until the desired fine distribution is achieved. The finished mill base is then dried and milled to give a powder. In addition to the relatively low content of phthalocyanine pigments and the expensive and involved method of preparation, such formulations have disadvantages in use; when they are dried, a substantial proportion of pigment agglomerates, which can only be redispersed with great effort, if at all, and which produces uneven colorations, for example in the beater coloring of paper; furthermore, the high content of the surfactants in the aqueous medium causes the dispersions formed to be so stable that the tinctorial strength of such a liquor can, as far as the beater coloring of paper or coloring of leather is concerned, only be utilized fully by special additional measures, e.g. the addition of salt.

We have found, surprisingly, that phthalocyanines may be easily water-dispersed if formulations are used which contain—based on the formulation—(a) from 70 to 90 percent by weight of a finely divided phathalocyanine pigment of which the mean primary particle size is less than 0.5 $\mu$m, and (b) from 30 to 5 percent by weight of one or more alkylarylsulfonic acids, which carry from 1 to 3 alkyls each of 4 to 20 carbon atoms as substituents, but the sum of the alkyl carbon atoms is not less than 8, which alkylarylsulfonic acids may be in the form of their water-soluble salts.

The pulverulent phthalocyanine formulations of the invention are extremely easily wetted by water and by a number of organic solvents, e.g. petroleum ether, gasoline, cyclohexane, pentane, benzene, toluene, xylene, chlorobenzene, carbon tetrachloride, perchloroethylene, trichloroethylene, diethyl ether, tetrahydrofuran and dioxane. Thus, simply sprinkling them into water and, if necessary, slight stirring with a glass rod suffices to achieve completely homogeneous distribution in water. The material is in such a finely divided state that the dispersion is clear and transparent, and simulates a solution. For example, a 3 percent strength by weight dispersion prepared using the pigment formulations of the invention can be filtered through 2 superposed paper filters (CV 1,450 from Schleicher & Schüll) virtually without leaving a residue. However, these are not true solutions, since on shining monochromatic light through them the Tyndall effect characteristic of colloidal solutions is observed. The aqueous dispersions obtained with the pigment formulations according to the invention are furthermore very stable. They can be boiled or stored for a lengthy period, e.g. for from several weeks to several months, at room temperature without significant sedimentation of pigment. On the other hand, the phthalocyanine pigments in the formulations according to the invention behave, when used as aqueous dispersions, like direct dyes; they are absorbed spontaneously and quantitatively on wool, cotton or paper pulp, so that in such processes the dye liquor which runs off is colorless.

The fomulations of the invention contain (a) from 70 to 95, preferably from 75 to 90, percent by weight—based on the formulation—of finely divided phthalocyanines and (b) from 5 to 30, preferably from 10 to 25, percent by weight of one or more alkylarylsulfonic acids.

Suitable phthalocyanines (a) are metal-free phthalocyanine, copper phthalocyanines in the $\alpha$- or $\beta$-modification, their mixtures and halo-copper phthalocyanines, e.g. polychloro-copper phthalocyanine of up to 16 chlorine atoms in the molecule or polychlorobromo-copper phthalocyanine of up to 16 chlorine and bromine atoms in the molecule. Amongst the phthalocyanines mentioned, metal-free phthalocyanine, copper phthalocyanine, which may contain up to 3 percent by weight of chlorine, and hexadecachloro-copper phthalocyanine are preferred.

In order that the phthalocyanine in the formulaton should be easily dispersible, it must be in a very finely divided state, i.e. the mean particle size of the primary particles must be less than 0.5 $\mu$m and preferably about 0.3 $\mu$m or less. In order to obtain deep colorations of a very pure hue it is necessary that the mean particle size of the primary particles should be from 0.2 to 0.1 $\mu$m or less. For this reason, formulations with phthalocyanines which have a particle size of 0.2 $\mu$m or less are particularly preferred.

For the purposes of the present invention, alkylarylsulfonic acids (b) are alkylbenzenes and/or alkylnaphthalenes which are sulfonated in the aromatic nucleus. The benzene or naphthalene nucleus carries from 1 to 3, preferably 1 or 2, alkyls of 4 to 20 carbon atoms, but the sum of the carbon atoms is at least 8. The alkyls are preferably of 8 to 20, especially of 8 to 12, carbon atoms. Specific examples of alkylbenzenes or alkylnaphthalenes on which the sulfonic acids are based are dibutylbenzene, octylbenzene, nonylbenzene, decylbenzene, hexadecylbenzene, dodecylbenzene, dibutylnaphthalene, octylnaphthalene, nonylnaphthalene, decylnaphthalene, dodecylnaphthalene, octadecylnaphthalene, hexadecylnaphthalene and octadecylbenzene. Amongst these, the sulfonic acids based on octylbenzene, nonylbenzene, decylbenzene, dodecylbenzene and dibutylnaphthalene are preferred, and those of dodecylbenzene, octylbenzene and decylbenzene are particularly preferred.

Though the alkylbenzenesulfonic acids, e.g. dodecylbenzenesulfonic acid, are as a rule liquid at room temperature, the pigment formulations of the invention are pulverulent. Only when they contain more than 40 percent by weight (based on the formulation) of dodecylbenzenesulfonic acid are such formulations pasty at room temperature. However, this does not affect their ease of dispersion in water. Since formulations containing more than 30 percent by weight of alkylarylsulfonic acids exhibit no further advantages over those containing up to 30 percent of sulfonic acids, the formulations with a higher alkylarylsulfonic acid content are of little technological interest, because of their lower pigment content. Examples of pigment formulations are those comprising from 75 to 87 percent by weight of a copper phthalocyanine in the β-modification, with a mean primary particle size of less than 0.2 μm, and from 13 to 25 percent by weight of dodecylbenzenesulfonic acid, or from 75 to 80 percent by weight of hexadecachloro-copper phthalocyanine with a mean primary particle size of less than 0.2 μm and from 20 to 25 percent by weight of dodecylbenzenesulfonic acid. Of course, the formulations of the invention may in addition contain small amounts of inert neutral substances, which may, for example, have arisen as by-products during manufacture or working-up of the pigment and which were not removed completely during isolation of the pigment. Examples of such inert neutral substances are neutral salts, e.g. ammonium sulfate or sodium sulfate, or by-products which do not interfere tinctorially. However, the amount of such substances present should be as low as possible and preferably less than 1, in particular less than 0.1, percent by weight based on the formulation.

The phthalocyanine formulations of the invention are manufactured by mixing the finely divided phthalocyanine (a), having primary particles smaller than 0.5 μm, preferably smaller than 0.3 μm, with the alkylarylsulfonic acid or with a mixture of such sulfonic acids; phthalocyanines with a mean primary particle size of from 0.2 to 0.1 μm, or less, are particularly preferred.

The finely divided phthalocyanines are preferably obtained by milling the crude pigments, in the absence of assistants, in mills, e.g. ball mills, vibratory mills, planetary ball mills and other units. The milling process is complete when the primary particle size is less than 0.5 μm, and preferably about 0.3 μm or below. Optimum formulations in respect of tinctorial strength and purity of hue are obtained if the material is milled until the mean primary particle size is from 0.2 to 0.1 μm or below. In the finished mill base, the fine primary particles form agglomerates of up to 100 μm in size. The milling process in general lasts from 2 to 48, preferably from 4 l to 20, hours, depending on the equipment used and the phthalocyanine employed. The optimum milling time can easily be determined as follows: during milling, samples are taken and are then mixed with the sulfonic acid in the desired manner. The solid formulation corresponding to the sample is then isolated from the mixture and its apparent solubility in water is determined, for example with the aid of the filter test.

On excessively long milling, the mill base can again become insoluble in the alkylarylsulfonic acid, i.e. formulations of which only a part remains apparently soluble in water are obtained. In that case, however, a formulation which is "soluble" in water can again be obtained by stirring the product with the sulfonic acid for from 50 to 120 hours.

The required finely divided phthalocyanines can also be obtained by precipitating solutions in sulfuric acid or chlorosulfonic acid by the addition to water or ice. This method is used preferably for the production of finely divided polychloro- and polychloro-bromo-copper phthalocyanines. The mixing of the finely divided phthalocyanine pigment with the alkylarylsulfonic acid can also be carried out simultaneously with the preparation of the finely divided pigment. It is true that the formulations thus obtained are readily wetted with water, but when they are introduced into water, pigment dispersions in which some of the pigment is not in a sufficiently finely divided form are obtained, i.e. in the filter test a significant proportion of the pigment is retained on the filter.

Advantageously, the formulations according to the invention are produced by introducing the finely divided phthalocyanine and the alkylarylsulfonic acid, in optional sequence, into an inert aprotic solvent having a boiling point of below 135° C. and stirring the mixture at from room temperature to the boiling point of the solvent, preferably at room temperature, until a homogeneous organic dispersion has been produced and a dried sample of this dispersion, when introduced into water, gives a clear dispersion which leaves no significant residue in the filter test. The solvent is then removed from the organic dispersion, for example by drying in an oven. Preferably, however, the formulation according to the invention is isolated by freeze-drying, since tinctorially particularly valuable products are obtained by this method.

Suitable inert aprotic solvents of boiling point below 135° C. are, above all, aliphatic hydrocarbons and aliphatic halohydrocarbons, cycloaliphatic and aromatic hydrocarbons, and mixtures of these. Specific examples are pentane, hexane, light gasoline of boiling range from 30° to 80° C., carbon tetrachloride, trichloroethylene, tetrachloroethylene, ethylene bromide, cyclohexane, benzene, toluene, chlorobenzene and xylene.

Preferred solvents are cyclohexane, benzene, p-xylene and ethylene bromide since with these the pigment formulation can be isolated particularly easily by freeze-drying.

Further solvents which can be used are aliphatic and cycloaliphatic ketones or cyclic ethers, e.g. acetone, methyl ethyl ketone, cyclohexanone, dioxane and tetrahydrofuran. However, these solvents are less suitable for the stated purpose.

The amount of solvent is not critical and can therefore be varied within a wide range. The lower limit is determined by the fact that the mixture of the phthalocyanine (a), the sulfonic acid (b) and the solvent should be capable of being mixed. This mixing and homogenization of the mixture can be effected by stirring or by kneading. In the latter case, the lower limit of the amount of solvent is 0.3 times the amount of weight of (a). The upper limit of the amount of solvent is in general from 15 to 20 times the amount by weight of (a). Since the solvent must be removed in order to isolate the formulation, the amount of solvent is kept as low as possible, for economic reasons. Where mixing is to be effected by stirring, it is advantageous to use an amount of solvent equal to from 1.2 to 6 times the amount by weight of (a). The use of larger amounts of solvent produces no advantages either in the properties of the pigment contained in the formulation or in respect of the homogenization of the mixture.

Thus, for example, a mixture of copper phthalocyanine of mean particle size less than 0.2 μm, dodecylbenzenesulfonic acid and p-xylene in the weight ratio of 1:0.3:1.28, on stirring with a conventional blade stirrer, gives a pourable and flowable mass which forms a homogeneous dispersion. After removal of the solvent, a formulation is obtained in which the pigment is dispersible by sprinkling onto water and shaking. The same result is achieved if the amount of solvent used is 10 times the amount by weight of pigment.

If the mixing is to be effected in kneaders or similar machinery, the lower limit of the amount of solvent can be reduced to from 0.3 to 0.4 times the amount by weight of (a); preferably, the amount of solvent is from 0.5 to 1.0 times the amount by weight of (a). When lesser amounts of solvent are used, the mixture may solidify to a firm mass which can no longer be worked, or can only be worked with high expenditure of energy. On working in kneaders and similar mixing machinery, high shearing forces are generally not generated during mixing, since the mixtures as a rule have only a low viscosity.

The phthalocyanine formulations according to the invention, obtained after removing the solvent, give an acid reaction in water. Thus, the pH of an aqueous dispersion which contains 1 percent by weight of a formulation comprising 23 percent by weight (based on the formulation) of dodecylbenzenesulfonic acid, is 2.2. In the dispersion, the sulfonic acid can be neutralized by adding alkaline compounds which give water-soluble salts with the acid. Neutralization does not affect the state of subdivision of the phthalocyanine in the dispersion.

Suitable alkaline compounds are only those which give water-soluble salts with the sulfonic acid, for example alkali metal hydroxides, alkali metal carbonates, ammonia, primary aliphatic amines, secondary aliphatic amines, tertiary aliphatic amines, in which the alkyl radicals may or may not be substituted by alkoxy or hydroxyl, saturated heterocyclic compounds with 5, 6 or 7 ring members, basic nitrogen being present as a ring member, or mixtures of these. In the aliphatic amines, alkyl is as a rule of 1 to 8, preferably of 1 to 4, carbon atoms and may or may not be substituted by alkoxy of 1 to 8, preferably of 1 to 4, carbon atoms, or by hydroxyl. Alkyl which is substituted in this way is preferably of 2 or 3 carbon atoms. If more than one alkyl, alkoxyalkyl and/or hydroxyalkyl is present in an amine, these radicals may be identical or different.

Specific examples of suitable alkaline compounds are sodium hydroxide, potassium hydroxide, sodium carbonate, potassium carbonate, sodium bicarbonate, potassium bicarbonate, gaseous or water-dissolved ammonia, methylamine, dimethylamine, trimethylamine, ethylamine, diethylamine, triethylamine, butylamine, dibutylamine, tributylamine, propylamine, dipropylamine, tripropylamine, ethanolamine, diethanolamine, triethanolamine, propanolamine, dipropanolamine, methoxyethylamine, methoxypropylamine, ethoxyethylamine, ethoxypropylamine, 2'-ethylhexoxypropylamine, propoxypropylamine, butoxypropylamine, morpholine, piperidine, pyrrolidine or mixtures of these.

The sulfonic acids contained in the formulations according to the invention can be neutralized after the formulations are introduced into water, but before they are used. Alternatively, the sulfonic acids can be neutralized immediately after preparing the organic dispersion (i.e. after reaching the stage when a dried sample, on introduction into water, gives a dispersion which leaves virtually no residue, if any, in the filter test) in the organic solvent. In such cases, primary aliphatic amines, secondary aliphatic amines, tertiary aliphatic amines or saturated 5-membered, 6-membered or 7-membered heterocyclic compounds which contain basic nitrogen as a ring member are used preferably, for reasons of solubility, or alternatively gaseous ammonia is passed into the dispersion until the stoichiometrically required amount has been taken up.

After drying, formulations which exhibit the same good properties as the formulations containing free sulfonic acid are obtained. Since the formulations according to the invention, which contain the sulfonic acids (b) in the form of water-soluble salts, are not corrosive toward metals, these formulations are particularly preferred.

The formulations according to the invention can be used for coloring water-thinnable finishes, paint dispersions, print pastes, inks and coating compositions, for wet-end coloring of paper, board and cellulose, for mass coloring of cement or plaster, and for the manufacture of solvent-containing print pastes and paints based on aromatic or aliphatic solvents.

The Examples which follow illustrate the formulations of the invention, their manufacture and their use. Percentages are by weight.

EXAMPLE 1

(a) 400 g of copper phthalocyanine in the β-modification (prepared from o-phthalodinitrile in nitrobenzene, in accordance with the Example of German Published Application DAS No. 1,569,646) are shaken for 12 hours in a 4 liter vibratory mill filled with 5.5 kg of iron balls of diameter from 1 to 2.5 cm. This converts the blue powder, which consists of long crystal needles (length from 1 to 100 μm) into a finely divided bluish black powder which has a metallic surface gloss and an increased tap density, and constitutes the mill base. As found from an X-ray diagram of a sample, the milling partially resulted in the formation of the α-modification and substantially destroyed the crystal lattice, as recognizable from the flattening-out of the diffraction line. The finished mill base consists of aggregates from 0.1 to 100 μm in size, which are formed from primary particles of 0.05 μm or less (the mean size of the primary particles being from 0.01 to 0.03 μm).

(b) 280 g of the mill base are introduced, at room temperature, into a solution of 84 g of dodecylbenzenesulfonic acid in 360 g of p-xylene and the mixture is stirred at room temperature for 16 hours with a conventional blade stirrer. The homogeneous, slightly pasty dispersion obtained is spread on a drying tray and dried under reduced pressure. A formulation which contains 77 percent of copper phthalocyanine and 23 percent of dodecylbenzenesulfonic acid is obtained. The formulation can be pulverized by grinding with a pestle or by milling in a coffee mill.

The formulation behaves as if the pigment was water-soluble. An aqueous "solution" which contains 1 percent of the formulation has a transparent blue color and exhibits a pH of 2.2.

(c) Testing the fineness of dispersion (filter test):

3 g of formulation (b) are worked into a paste with 10 ml of cold water, 90 ml of boiling water are poured over the paste and the mixture is boiled for 2.5 minutes. The transparent dye dispersion is then suction-filtered, by means of a water-pump, through a Büchner funnel ($\phi$9 cm) on which are two superposed paper filters No. CV 1450 from Schleicher & Schüll. The dispersion runs through the filters in less than one minute, leaving virtually no residue.

EXAMPLE 2

280 g of the mill base obtained as described in Example 1(a) are introduced, at room temperature, into a solution of 110 g of dodecylbenzenesulfonic acid in 400 g of p-xylene and the mixture is stirred for 16 hours at room temperature. It is then poured out onto a drying tray and dried to constant weight under reduced pressure. A formulation which contains 72 percent of copper phthalocyanine and 28 percent of dodecylbenzenesulfonic acid is obtained. The dried material can be comminuted by means of a pestle or a coffee mill, to give a powder.

Filter test as described in Example 1(c): The dispersion runs through the filters in less than one minute. Virtually no residue is detectable on the filters.

EXAMPLE 3

The procedure described in Example 2 is followed, but the mill base is introduced into a solution of 56 g of dodecylbenzenesulfonic acid in 500 g of p-xylene. After drying, a formulation which contains 83.4 percent of copper phthalocyanine and 16.6 percent of dodecylbenzenesulfonic acid is obtained.

In the filter test (see Example 1(c))the dispersion runs through the filters in less than one minute. Virtually no residue is detectable on the filters.

EXAMPLE 4

The procedure described in Example 1 is followed, but the mill base is introduced into a solution of 44 g of dodecylbenzenesulfonic acid in 500 g of cyclohexane. The mixture is stirred for 90 hours at room temperature. The formulation is obtained by drying under reduced pressure.

A 3 percent strength aqueous dispersion gives no residues on the filters in the filter test.

EXAMPLE 5

(a) 400 g of copper phthalocyanine (manufactured by the solvent process from o-phthalodinitrile in the presence of ammonia) are milled as described in Example 1(a). However, the milling time is 48 hours. The mill base consists of agglomerates of from 10 to 100 μm in size, formed from primary particles of 0.05 μm or less (the mean size of the primary particles being 0.02 μm).

(b) 280 g of the mill base 5(a) are converted to the formulation by stirring for 90 hours, as described in Example 1(b). The formulation obtained is easily dispersed by stirring into water.

In the filter test, a 3 percent strength dispersion runs through the filters in less than one minute. No residue is detectable on the filters.

EXAMPLE 6

200 g of hexadecachloro-copper phthalocyanine are dissolved in 1,000 g of chlorosulfonic acid at from 30° to 50° C. and the solution is poured onto 10,000 g of water at from 30° to 50° C. The amorphous hexadecachloro-copper phthalocyanine thus obtained is filtered off, and washed neutral and sulfate-free. 1,120 g of a water-moist filter residue of 18% solids content are obtained. It is stirred with 100 g of p-xylene, whereupon a lumpy, pasty mass forms spontaneously from the hexadecachloro-copper phthalocyanine and the p-xylene, and the water separates out. The water is decanted off and the residual water remaining in the interstices of the lumps is removed azeotropically at 93° C. by heating to the boil with p-xylene. The viscous, pasty mass is then mixed with 300 g of p-xylene and 66 g of dodecylbenzenesulfonic acid and this suspension is stirred for 10 hours at from 120° to 130° C. After cooling to room temperature, the mixture is uniformly spread on a drying tray and is dried under reduced pressure. The formulation thus obtained can be milled to a powder by means of a pestle or in a coffee mill.

In the filter test as described in Example 1(c), a 3% strength dispersion runs through the filters in a short time. Virtually no residue is detectable on the filters.

EXAMPLE 7 (USE EXAMPLE)

Wet-end Colorng of Paper 5 g of a paper stock, consisting of 60% of groundwood and 40% of unbleached sulfite cellulose, 2 ml of a 5 percent strength rosin size solution (corresponding to 2%, based on paper stock), 3 ml of a 10 percent strength aluminum sulfate solution (corresponding to 6%) and 60 mg of the formulation obtained as described in Example 1 are slowly stirred into 100 ml of water for 30 minutes at room temperature. The mixture is then diluted with 500 ml of water and the paper pulp is drained on a plane wire of 30 μm mesh size by applying suction, and is calendered and dried. The water draining from the wire is virtually colorless. The sheet obtained has a level deep greenish blue color which is more intense, of purer hue and more level than colorations obtained with copper phthalocyanine formulations of the prior art.

If, instead of the formulation obtained as described in Example 1, those obtained as described in Example 2, 3, 4 or 5 are used, equally good results are achieved.

If the above formulation is replaced by the formulation obtained as described in Example 6, a paper sheet having a level yellowish green color is obtained. Here again, the back water is virtually colorless. The coloration is of a purer hue, more yellowish and more intense than those obtained with polychloro-copper phthalocyanine formulations of the prior art.

EXAMPLE 8 (USE EXAMPLE)

Wet-end Coloring of Paper without Additives 5 g of the paper stock described in Example 7 and 60 mg of the formulation obtained as described in Example 5 are stirred into 100 ml of water for 30 minutes at room temperature. The mixture is then diluted with 500 ml of water and the paper pulp is drained on a plane wire of 30 μm mesh width by applying suction; the residue is calendered and dried. The water draining from the wire is virtually colorless. The sheet obtained has a level deep greenish blue color.

If instead of the formulation according to the invention, copper phthalocyanine formulations of the prior art are used, virtually colorless paper sheets are obtained.

An equally good result is achieved if the formulation from Example 5 is replaced by those obtained as described in Example 1, 2, 3, 4 or 6. In the latter case, a green paper is obtained.

EXAMPLE 9

50 g of the mill base obtained as described in Example 1(a) (primary particle size 0.1 μm or less) are introduced, at room temperature, into a solution of 15 g of dodecylbenzenesulfonic acid in 250 g of cyclohexane and the mixture is stirred for 24 hours at room temperature. 3.5 g of mono-n-butylamine (corresponding to the amount required for the sulfonic acid) dissolved in 20 g of cyclohexane are then added and the mixture is stirred for a further 16 hours at room temperature, in the course of which the viscosity of the pigment suspension rises slightly. The homogeneous dispersion is then spread uniformly on a drying tray and is dried under reduced pressure.

The product obtained can be pulverized in a coffee mill or by means of a pestle.

In the filter test (see Example (1c)), virtually no residue remains on the filter.

The aqueous dispersion has a pH of 7.4.

If instead of n-butylamine the same amount of tert.-butylamine or sec.-butylamine is used, a formulation having the same properties is obtained. The pH of the 3 percent strength aqueous dispersion is from 7.2 to 7.4.

EXAMPLE 10

400 g of the mill base prepared as described in Example (1a) and having a primary particle size of from 0.2 to 0.1 $\mu$m are introduced into 2,000 g of cyclohexane and 120 g of dodecylbenzenesulfonic acid and the mixture is stirred for 48 hours at room temperature. 33 g of dimethylethanolamine are then added. The mixture is stirred for a further 16 hours at room temperature and poured onto a drying tray, and the solvent is removed under reduced pressure.

The formulation obtained is completely dispersible in water. In the filter test (see Example 1(c)), no residue is found on the filters. A 3 percent strength aqueous dispersion has a pH of 6.1.

EXAMPLE 11

392 g of β-copper phthalocyanine which has been milled as described in Example (1a) (primary particles 0.1 $\mu$m or smaller) are introduced into 118 g of dodecylbenzenesulfonic acid and 500 g of light gasoline of boiling range from 60° to 80° C., and the mixture is stirred for 16 hours at room temperature. The dispersion is then heated to the boil and 300 g of the light gasoline are distilled off under atomospheric pressure, whilst stirring. The residue is then evaporated to dryness under reduced pressure. The dry mass obtained, after pulverizing, is instantly and completely dispersible in water. In the filter test, no residue is detectable on the filter.

EXAMPLE 12

360 g of the mill base obtained as described in Example 5(a) (mean primary particle size 0.3 $\mu$m) are introduced into a solution of 90 g of dodecylbenzenesulfonic acid in 1,000 g of trichloroethylene and the mixture is stirred for 3 hours at room temperature. 600 g of trichloroethylene are then distilled off under atmospheric pressure and the residue is evaporated to dryness under reduced pressure. The dry mass obtained, when pulverized, is almost completely dispersible in water. In the filter test as described in Example 1(c), a slight residue remains.

EXAMPLE 13

50 g of the mill base obtained as described in Example 5(a) (mean primary particle size 0.3 $\mu$m) are introduced into a solution of 5.3 g of dodecylbenzenesulfonic acid in 200 g of cyclohexane and the mixture is stirred for 60 hours at room temperature. It is then dried under reduced pressure. The pigment formulation, which contains 10 percent of dodecylbenzenesulfonic acid and 90 percent of copper phthalocyanine, gives intense but not entirely homogeneous paper colorations when used as described in Example 7. In the filter test as described in Example 1(c), a distinctly recognizable residue is found.

EXAMPLE 14

50 g of the mill base obtained as described in Example 5(a) (mean primary particle size 0.3 $\mu$m) are introduced into a solution of 15 g of dibutylnaphthalenemonosulfonic acid (which in addition contains some of the corresponding disulfonic acid) in 200 g of p-xylene and the mixture is stirred for 60 hours at room temperature. It is then dried under reduced pressure. The pigment formulation, which contains 77 percent of copper phthalocyanine and 23 percent of the sulfonic acid mixture, gives good, intense paper colorations when used as described in Example 7, but shows a recognizable residue in the filter test as described in Example 1(c).

EXAMPLE 15

(a) 200 g of copper phthalocyanine containing 2.7 percent of chlorine (manufactured from phthalodinitrile and copper-I chloride by the baking process) are shaken for 10 hours in a 4 liter vibratory mill filled with 5.5 g of iron balls of diameter from 1 to 2.5 cm. This produces a milled material which has a metallic gloss and an increased tap density and which consists of aggregates of from 0.1 to 100 $\mu$m in size, formed from amorphous primary particles of 0.05 $\mu$m or less.

(b) 96 g of the mill base are introduced, at room temperature, into a solution of 24 g of dodecylbenzenesulfonic acid in 750 g of p-xylene and the mixture is stirred for 96 hours at room temperature by means of a blade stirrer. The resulting homogeneous, easily poured dispersion is spread on a drying tray and dried under reduced pressure (about 1 mm Hg). A formulation which contains 80 percent by weight of copper phthalocyanine and 20 percent by weight of dodedylbenzenesulfonic acid is obtained.

The formulation behaves as if the pigment was water-soluble. When tested for water solubility as described in Example 1), virtually no residue is found on the filter.

EXAMPLE 16

8.6 g of chlorosulfonic acid are added dropwise to a solution of 14.1 g of n-octylbenzene in 60 g of cyclohexane at room temperature and the mixture is then stirred at from 40° to 50° C. until the evolution of gas has ceased. It is then diluted with 180 g of cyclohexane at room temperature and 80 g of the mill base produced as described in Example 1(a) are introduced into this solution. This mixture is stirred for 48 hours at room temperature and is then poured out onto a drying tray and dried under reduced pressure. A pigment formulation which is very easily wetted in water and is apparently soluble, and comprises 16 percent by weight of n-octylbenzenesulfonic acid and 84 percent by weight of copper phthalocyanine, is obtained. In the filter test as described in Example 1(c), virtually no residue is found on the filter.

EXAMPLE 17

200 g of metal-free phthalocyanine are milled for 20 hours in a 4 liter vibratory mill filled with 5.5 kg of iron balls of diameter from 1 to 2.5 cm. The primary particles have a size of <0.05 $\mu$m and form agglomerates of from 5 to 100 $\mu$m.

80 g of the mill base obtained are introduced into a solution of 20 g of dodecylbenzenesulfonic acid in 400 g of p-xylene and the mixture is stirred for 20 hours at room temperature. Thereafter the readily flowable mixture is spread uniformly on a drying tray and dried under reduced pressure. An easily pulverized pigment formulation comprising 20 percent of dodecylbenzenesulfonic acid and 80 percent of metal-free phthalocyanine is obtained, which can be wetted exceptionally easily with water and when used for the wet-end coloring of paper as described in Example 7 gives papers having a very strong greenish blue color. In the filter test as described in Example 1(c), a slight residue is found on the filters.

EXAMPLE 18

280 g of the mill base obtained as described in Example 5(a) (mean primary particle size from 0.2 to 0.3 μm) are introduced into a solution of 84 g of dodecylbenzenesulfonic acid in 360 g of p-xylene at room temperature and the mixture is stirred for 26 hours at room temperature. 4.7 g of gaseous ammonia are passed into the mixture through a gas inlet tube over 4 hours at room temperature, with continued stirring, until the mixture is saturated; at the same time the viscosity of the initially mobile mixture increases slightly. The material is then spread uniformly on a drying tray and dried under reduced pressure. An easily pulverized pigment formulation is obtained, which in water behaves like a soluble dye, produces excellent coloration of paper pulps and gives a virtually neutral reaction.

In the filter test as described in Example 1(c), very small amounts of residue are found on the filters.

We claim:

1. An easily water-dispersed phthalocyanine pigment formulation which contains, based on the total weight of the formulation,
   (a) from 70 to 95 percent by weight of a finely divided phthalocyanine pigment of which the mean primary particle size is less than 0.5 μm, and
   (b) from 30 to 5 percent by weight of at least one alkylbenzenesulfonic acid or alkylnaphthalenesulfonic acid having from 1 to 3 alkyl of 8 to 20 carbon atoms in each alkyl, said at least one sulfonic acid being present in free acid form or in the form of its water-soluble salt, the formulation being obtained by introducing and mixing the pigment (a) and the acid (b), in any sequence, into an inert aprotic solvent having a boiling point below 135° C., stirring or kneading the resulting mixture at from room temperature up to the boiling point of said aprotic solvent until an homogenous dispersion has formed from which a dried sample is dispersible in water without leaving any significant residue, and then removing the aprotic solvent.

2. A formulation as claimed in claim 1, which contains from 75 to 90 percent by weight of (a) and from 10 to 25 percent by weight of (b).

3. A formulation as claimed in claim 2, in which (a) has a mean primary particle size of 0.3 μm or less.

4. A formulation as claimed in claim 2, in which (a) is metal-free phthalocyanine, copper phthalocyanine in the α- or β-modification, copper phthalocyanine which contains up to 3 percent by weight of chlorine, polychloro-copper phthalocyanine with up to 16 chlorine atoms in the molecule, polychloro-bromo-copper phthalocyanine with up to 16 bromine and chlorine atoms in the molecule, or a mixture thereof.

5. A formulation as claimed in claim 3, in which (a) is metal-free phthalocyanine, copper phthalocyanine in the α- or β-modification, copper phthalocyanine which contains up to 3 percent by weight of chlorine, polychloro-copper phthalocyanine with up to 16 chlorine atoms in the molecule, polychloro-bromo-copper phthalocyanine with up to 16 bromine and chlorine atoms in the molecule, or a mixture thereof.

6. A formulation as claimed in claim 1, in which (b) is a sulfonic acid of one or more alkylbenzenes or alkylnaphthalenes which carry 1 or 2 alkyl groups of 8 to 12 carbon atoms.

7. A formulation as claimed in claim 3, in which (b) is a sulfonic acid of one or more alkylbenzenes or alkylnaphthalenes which carry 1 or 2 alkyl groups of 8 to 12 carbon atoms.

8. A formulation as claimed in claim 2, in which (b) is present in the form of salts with ammonia, with primary aliphatic amines, secondary aliphatic amines or tertiary aliphatic amines where alkyl is of 1 to 8 carbon atoms, with alkoxyalkylamines, where alkoxy is of 1 to 8 carbon atoms and alkyl is of 2 or 3 carbon atoms, with bis-(alkoxy-alkyl)-amines, where alkoxy is of 1 to 8 carbon atoms and alkyl is of 2 or 3 carbon atoms, with mono-, di- and tris-hydroxyalkyl-amines, where alkyl is of 2 or 3 carbon atoms, or with saturated 5-, 6- or 7-membered heterocyclic compounds which contain basic nitrogen as a ring member.

9. A formulation as claimed in claim 4, in which (b) is present in the form of salts with ammonia, with primary aliphatic amines, secondary aliphatic amines or tertiary aliphatic amines where alkyl is of 1 to 8 carbon atoms, with alkoxyalkylamines, where alkoxy is of 1 to 8 carbon atoms and alkyl is of 2 or 3 carbon atoms, with bis-(alkoxy-alkyl)-amines, where alkoxy is of 1 to 8 carbon atoms and alkyl is of 2 or 3 carbon atoms, with mono-, di- and tris-hydroxyalkyl-amines, where alkyl is of 2 or 3 carbon atoms, or with saturated 5-, 6- or 7-membered heterocyclic compounds which contain basic nitrogen as a ring member.

10. A formulation as claimed in claim 6, in which (b) is present in the form of salts with ammonia, with primary aliphatic amines, secondary aliphatic amines or tertiary aliphatic amines where alkyl is of 1 to 8 carbon atoms, with alkoxalkylamines, where alkoxy is of 1 to 8 carbon atoms and alkyl is of 2 or 3 carbon atoms, with bis-(alkoxy-alkyl)-amines, where alkoxy is of 1 to 8 carbon atoms and alkyl is of 2 or 3 carbon atoms, with mono-, di- and tris-hydroxyaklkyl-amines, where alkyl is of 2 or 3 carbon atoms, or with saturated 5-, 6- or 7-membered heterocyclic compounds which contain basic nitrogen as a ring member.

11. A formulation as claimed in claim 1 wherein the sulfonic acid component is neutralized, after forming said homogenous dispersion, by means of adding an alkaline compound which gives a water-soluble salt with said sulfonic acid.

12. A formulation as claimed in claim 11 wherein said alkaline compound is selected from the group consisting of sodium hydroxide, potassium hydroxide, sodium carbonate, potassium carbonate, sodium bicarbonate, potassium bicarbonate, gaseous or water-dissolved ammonia, methylamine, dimethylamine, trimethylamine, ethylamine, diethylamine, triethylamine, butylamine, dibutylamine, tributylamine, propylamine, dipropylamine, tripropylamine, ethanolamine, diethanolamine, triethanolamine, propanolamine, dipropanolamine, methoxyethylamine, methoxypropylamine, ethoxyethylamine, ethoxypropylamine, 2'-ethylhexoxypropylamine, propoxypropylamine, butoxypropylamine, morpholine, piperidine and pyrrolidine.

13. A formulation as claimed in claim 1 wherein said aprotic solvent has been removed by drying under a reduced pressure.

14. A formulation as claimed in claim 13 wherein the aprotic solvent is selected from the group consisting of pentane, hexane, light gasoline boiling from 30° to 80° C., carbon tetrachloride, trichloroethylene, tetrachloroethylene, ethylene bromide, cyclohexane, benzene, toluene, chlorobenzene and xylene.

15. A formulation as claimed in claim 1 wherein said aprotic solvent has been removed by freeze-drying.

16. A formulation as claimed in claim 15 wherein the aprotic solvent is selected from the group consisting of cyclohexane, benzene, p-xylene and ethylene bromide.

* * * * *